United States Patent
Hermann et al.

[15] 3,679,796
[45] July 25, 1972

[54] METHODS OF CONTROLLING RODENTS AND LEPORINE ANIMALS

[72] Inventors: Gunter Hermann, Leverkusen; Karl-Julius Schmidt, Wuppertal-Vohwinkel, both of Germany

[73] Assignee: Farbenfabriken Bayer Aktiengesellschaft, Leverkusen, Germany

[22] Filed: Dec. 8, 1969

[21] Appl. No.: 883,335

[30] Foreign Application Priority Data

Dec. 10, 1968 Germany..................P 18 13 696.4

[52] U.S. Cl................................424/211, 424/199, 424/200, 424/203, 424/210, 424/215
[51] Int. Cl. ..........................................A01n 9/36
[58] Field of Search..................424/200, 199, 211, 203, 215, 424/216

[56] References Cited

UNITED STATES PATENTS

| | | | |
|---|---|---|---|
| 2,994,638 | 8/1961 | Malz et al. | 424/200 |
| 3,180,873 | 4/1965 | Schmidt et al. | 424/200 |

*Primary Examiner*—Albert T. Meyers
*Assistant Examiner*—Frederick E. Waddell
*Attorney*—Burgess, Dinklage and Sprung

[57] ABSTRACT

Methods of selectively combating and controlling rodents and leporine animals using certain phosphorus acid esters, i.e. phosphoric, phosphonic, thionophosphoric and thionophosphonic acid esters, or (alkyl and O-alkyl)-O-alkyl-O-[2-(N,N-di[alkyl, alkenyl and cyanoalkyl]-amino-methyl) and 2-(pyrrolidino, piperidino and morpholino)-methyl-4-(alkyl, alkylmercapto, alkylsulfoxyl, alkylsulfonyl, nitro, cyano, aminocarbonyl and chloro)-3,5 and/or 6-(optionally mono and di chloro, nitro and alkyl)-phenyl]-phosphoric, phosphonic, thionophosphoric and thionophosphonic acid esters, and the corresponding dimethyl sulfate quaternary ammonium salts thereof, which are known, which possess strong and selective rodenticidal properties, and which may be produced by conventional methods.

10 Claims, No Drawings

METHODS OF CONTROLLING RODENTS AND LEPORINE ANIMALS

The present invention relates to and has for its objects the provision for particular new methods of selectivity combating and controlling rodents and leporine animals using certain phosphorus acid esters, i.e., phosphoric, phosphonic, thionophosphoric and thionophosphonic acid esters, or (alkyl and 0-alkyl)-0-alkyl-0-[2-(N,N-di[alkyl, alkenyl and cyano-alkyl]-amino-methyl) and 2-(pyrrolidino, piperidino and morpholino)-methyl-4-(alkyl, alkylmercapto, alkylsulfoxyl, alkylsulfonyl, nitro, cyano, amino-carbonyl and chloro)-3,5 and/or 6-(optionally mono and di chloro, nitro and alkyl)-phenyl]-phosphoric, phosphonic, thionophosphoric and thionophosphonic acid esters, and the corresponding dimethyl sulfate quaternary ammonium salts thereof, which are known and which possess valuable strong and selective rodenticidal properties, alone or in the form of mixtures of such compounds with solid and liquid dispersible carrier vehicles, with other and further objects becoming apparent from a study of the within specification and accompanying examples.

It is known that 1,2,3,4,10,10-hexachloro-exo-6,7-epoxy-1,4,4a,5,6,7,8,8a-octahydro-1,4,5,8-endo, endo-dimethane-naphtha-lene (A), chlorinated camphene (B), amido (thio) phosphoric as well as acetamidido (thio) phosphoric acid esters or -phosphonic acid esters, such as 0,0-di(parachlorophenyl)-N,N-diethylamidophosphoric acid ester (C) and 0,0-di-(parachlorophenyl)-N-(acetimido)-amido-thionophosphoric acid ester or 0,0-di-(parachlorophenyl)-N-acetamidino-thionophosphoric acid ester (D), can be employed in the method of surface poisoning for combating harmful rodents. The compound 0,0-diethyl-0-(4-nitro-phenyl)-thionophosphoric acid ester (E) is also known to possess rodenticidal activity.

The two former substances (A) and (B) have gained considerable importance in practice. However, in many countries the use of 1,2,3,4,10,10-hexachloro-eco-6,7 -epoxy-1, 4, 4a, 5, 6, 7, 8, 8a-octahydro-1, 4, 5,8-endo, endo-dimethane-naphthalene (A), has been forbidden by law, and in Germany for instance the official recommendation of this compound for the purpose indicated was withdrawn because, when using such substance, residues which have a toxic action are in the long term left on the plants treated therewith (a danger to domestic animals and game) as well as in the soil, so that there is a danger of poisoning soil water. Furthermore, compound (A) is extremely poisonous to fish. In the case of chlorinated camphene (B), it is necessary to use very large amounts of this material. This active substance (B) is again very toxic to fish. Both chlorinated hydrocarbons (A) and (B) additionally endanger the wildlife community through the natural enemies of harmful rodents being poisoned when they consume poisoned rodents.

The amido (thio) phosphoric acid esters, such as compound (C), known from German Patent 1,076,437, must also be employed in very large amounts. Such compounds are furthermore much less toxic to common voles, against which they are mainly intended to act, than to rats and laboratory mice. Thus, for example the peroral $LD_{50}$ of a similar compound, 0,0-di-(parachlorophenyl)-N,N-dimethylamido-phosphoric acid ester or N,N-dimethyl-amido-phosphoric acid 4,4'-dichlorodiphenyl ester (F), is 25 mg/kg of rat, 10 mg/kg of mouse and 125 mg/kg of common vole; common voles in isolated cases even survive doses of 250 mg/kg. In agreement therewith, our own tests in the open have shown that even the use of 100 g of active compound (F) per hectare is not enough to ensure certain total destruction of common voles. The rodentically active acetamidido (thio) phosphoric acid esters or -phosphonic acid esters, such as compound (D), according to German Patent 1,196,987, also require an amount of at least 1,000 g of active substance to be used per hectare for an $LD_{50}$ of 10 mg/kg of rat.

It has now been found, in accordance with the present invention, that certain phosphorus acid esters, i.e., phosphoric, phosphonic, thionophosphoric and thionophosphonic acid esters, which are known, of the formula

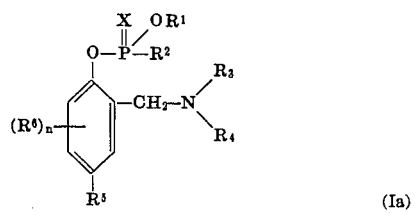

(Ia)

in which $R^1$ is alkyl of one to four carbon atoms, $R^2$ is $OR^1$ or alkyl of one to four carbon atoms, $R^3$ and $R^4$ each individually is alkyl of one to eight carbon atoms, alkenyl of three to four carbon atoms or cyanoalkyl having one to four carbon atoms in the alkyl moiety, with the proviso that $R^3$ and $R^4$ when taken together with the adjacent N atom form a pyrrolidino, piperidino or morpholino group, $R^5$ is alkyl of one to four carbon atoms, alkylmercapto of one to four carbon atoms, alkylsulfoxyl of one to four carbon atoms, alkylsulfonyl of one to four carbon atoms, nitro, cyano, aminocarbonyl, or chloro, $R^6$ is chloro, nitro or alkyl of one to four carbon atoms, X is oxygen or sulfur, and n is a whole number from 0 to 2, and their corresponding dimethyl sulfate quaternary ammonium salts, alone or in admixture with a solid or liquid diluent or carrier, exhibit strong, especially selective, rodenticidal properties with respect to rodents and leporine animals.

The compounds of Formula (Ia) above can also be used according to the present invention in their water-soluble forms produced by quaternization of the aminoethyl group. Suitable quaternizing agents include for example hydrogen halides, especially hydrogen chloride, alkyl halides, especially iodides, and dialkyl sulfates, especially dimethyl sulfate, and the like.

Some of the compounds of Formula (Ia) above have already been described as insecticides. It is however very surprising that in contrast to other toxic (thio)-phosphoric acid esters or -phosphonic acid esters, such as known compounds (A) to (F) noted above, the instant compounds of formula (Ia) above, including said salts, according to the present invention are rodentically fully effective when used in even very small amounts and that they furthermore do not possess the above-mentioned harmful side-effects of the known chlorinated hydrocarbons as mentioned above. Therefore, the use of the instant compounds according to the present invention represents a valuable contribution to the art.

The compounds of Formula (Ia) above, usable according to the present invention, may be obtained in known manner, for example pursuant to the data of German Patent 1,211,654, in accordance with the following reaction scheme:

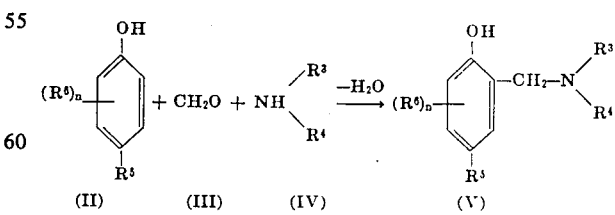

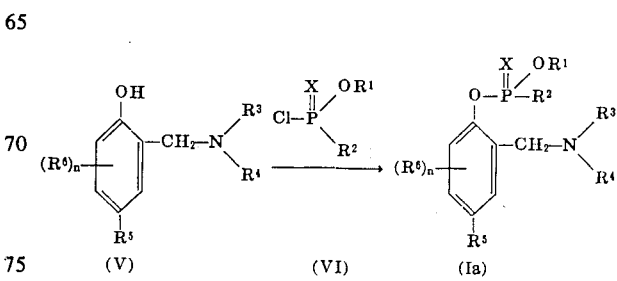

The active compounds usable according to the present invention are clearly characterized by the Formula (Ia) above.

Advantageously, in accordance with he present invention, in the various formulas herein:

$R^1$ represents straight and branched chain lower alkyl hydrocarbon of one to four carbon atoms such as methyl, ethyl, n- and iso- propyl, n-, iso-, sec.- and tert.- butyl, and the like, especially $C_{1-3}$ or $C_{1-20}$ alkyl;

$R^2$ represents $OR^1$ in which $R^1$ is the same as defined above such that the radical $R^1$ and the moiety $R^1$ of the radical $OR^1$ may be the same or different lower alkyl radical or straight and branched chain lower alkyl hydrocarbon of one to four carbon atoms such as methyl to tert.- butyl inclusive, as defined above, and the like, especially $C_{1-3}$ or $C_{1-2}$ alkyl;

$R^3$ and $R^4$ each individually represents straight and branched chain alkyl hydrocarbon of one to eight atoms such as methyl to tert.-butyl inclusive, as defined above, n- and iso- -amyl, -hexyl, -heptyl, -octyl, 2-ethyl-hexyl, and the like, especially lower alkyl, and more especially $C_{1-4}$ or $C_{1-3}$ or $C_{1-2}$ alkyl, straight and branched chain lower alkenyl hydrocarbon of three to four carbon atoms such as $\alpha$-, $\beta$- and $\gamma$- allyl i.e., prop-2-enyl, 1-methyl-vinyl and prop-1-enyl), but-1,2 and 3-enyl, 1- and 2-methyl-prop-1,2 and 3-enyl, and the like, especially allyl, and more especially prop-2-enyl, or cyano lower alkyl having one to four carbon atoms in the alkyl moiety such as cyano-substituted methyl to tert.-butyl inclusive, as defined above, including 2-cyano-ethyl, and the like, especially cyano-$C_{1-3}$ or $C_{1-2}$ alkyl, and more especially 107 -cyano-$C_{1-4}$ or $C_{1-3}$ or $C_{1-2}$ alkyl;

with the proviso that $R^3$ and $R^4$ when taken together with the adjacent N atom represent pyrrolidino, piperidino, or morpholino;

$R^5$ represents straight and branched chain lower alkyl hydrocarbon of one to four carbon atoms such as methyl to tert.-butyl inclusive, as defined above, and the like, especially $C_{1-3}$ or $C_{1-2}$ alkyl, straight and branched chain lower alkylmercapto having one to four carbon atoms in the alkyl moiety such as methyl to tert.-butyl inclusive, as defined above, and the like, -mercapto, especially $C_{1-3}$ or $C_{1-2}$ alkylmercapto, straight and branched chain lower alkylsulfoxyl having one to four carbon atoms in the alkyl moiety such as methyl to tert.-butyl inclusive, as defined above, and the like, -sulfoxyl (i.e.,—SO—), especially $C_{1-3}$ or $C_{1-2}$ alkylsulfoxyl, straight and branched chain lower alkylsulfonyl having 1-4 carbon atoms in the alkyl moiety such as methyl to tert.-butyl inclusive, as defined above, and the like, -sulfonyl (i.e.,—SO_2—), especially $C_{1-3}$ or $C_{1-2}$ alkylsulfonyl, nitro, cyano, aminocarbonyl, i.e., carbamyl ($NH_2CO—$), or chloro;

$R^6$ represents chloro, nitro, or straight and branched chain lower alkyl hydrocarbon of one to four carbon atoms such as methyl to tert.-butyl inclusive, as defined above, and the like, especially $C_{1-3}$ or $C_{1-2}$ alkyl;

X represents oxygen, or sulfur; and n represents a whole number from 0 to 2;

such that the corresponding dimethyl sulfate quaternary ammonium salts are also contemplated.

Preferably, $R^1$ is $C_{1-3}$ or $C_{1-2}$ alkyl; $R^2$ is $OR^1$; or $C_{1-3}$ or $C_{1-2}$ alkyl; $R^3$ and $R^4$ each individually is $C_{1-8}$ or $C_{1-4}$ alkyl; or $C_{3-4}$ alkenyl; or $\omega$-cyano-$C_{1-3}$ or $C_{1-2}$ alkyl; or $R^3$ and $R^4$ together with the adjacent N atom form pyrrolidino; or piperidino; or morpholino; $R^5$ is $C_{1-3}$ or $C_{1-2}$ alkyl; or $C_{1-3}$ or $C_{1-2}$ alkylmercapto; or $C_{1-3}$ or $C_{1-2}$ alkylsulfoxyl; or $C_{1-3}$ or $C_{1-2}$ alkylsulfonyl; or nitro; or cyano; or aminocarbonyl; or chloro; $(R^6)_n$ is 5- or 6-chloro; or 3,6-dichloro; or 5-($C_{1-3}$ or $C_{1-2}$ alkyl); or 5-nitro; X is oxygen; or sulfur; especially sulfur; and n is 0 to 2; such that the corresponding dimethyl sulfate quaternary ammonium salts are also contemplated.

In particular, $R^1$ is $C_{1-2}$ alkyl; $R^2$ is $OR^1$; or $C_{1-2}$ alkyl; $R^3$ and $R^4$ each individually is $C_{1-2}$ alkyl; $R^5$ is $C_{1-2}$ alkylmercapto; or $C_{1-2}$ alkylsulfoxyl; X is oxygen; or sulfur; especially sulfur; and n is 0; such that the corresponding dimethyl sulfate quaternary ammonium salts are also contemplated.

Advantageously, because of their rodenticidal properties, the compounds of Formula (Ia) above, and said salts, according to the present invention, are suitable for use as surface treatment agents for combating leporine animals (Lagomorpha) and rodents (Rodentia), such as squirrel-like animals (Sciuroidea), gophers, (Geomyoidae) and mouse-like animals (Muroidea), with which there are classed essentially the dormouse-like animals (Muscardinidae) and the mice (Muridae); and the like.

The leporine animals contemplated herein especially include the Leporidae, such as the rabbit (*Oryctolagus cuniculus*), the squirrel-like animals for example include the European souslik (*Citellus citellus*) and the ground squirrel (*Citellus lateralis*) and the gophers for example include the mountain pocket gopher (*Thomomys talpoides*); and the like.

With the dormouse-like animals contemplated herein there is classed, for example, the fat dormouse (*Glis glis*), and the like.

The mice contemplated herein essentially comprise, in the group of the long-tailed mice (Murinae), the rats (Rattus spec.), such as the black rat (*Rattus rattus*) and the Norway rat (*Rattus norvegicus*); the house mice (Mus spec.), such as *Mus musculus*; in the group of the hamster-like animals (Cricetinae) the European hamster (*Cricetus cricetus*) and in the group of the short-tailed mice (Microtinae) for example the common vole (*Microtus arvalis*), the field vole (*Microtus agrestis*) and the water vole (*Arvicola terrestris*); and the like.

Significantly, in addition to their outstanding rodenticidal properties (and the insecticidal activity mentioned above) the compounds of Formula (Ia) above, and said salts, according to the present invention have also been found to possess acaricidal, systemic and nematocidal activities as well.

Surprisingly, in terms of the toxic concentrations needed to kill rodents and leporine animals, the instant active compounds are only slightly toxic, if at all, to other warm-blooded creatures, such as useful birds, domestic animals and game, nor are such compounds toxic to fish. Furthermore, the instant active compounds to not leave toxic residues on or in plants exposed thereto or the vicinal soil.

The active compounds according to the instant invention can be utilized, if desired, in the form of the usual formulations or compositions with conventional, preferably inert, i.e., plant compatible or herbicidally inert) pesticide diluents or extenders, i.e., diluents or extenders of the type usable in conventional pesticide formulations or compositions, e.g., conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g., benzene, toluene, xylene, etc., halogenated, especially chlorinated, aromatic hydrocarbons (e.g., chloro-benzenes), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, alumina, silica, chalk, i.e., calcium carbonate, talc, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other rodenticides, or herbicides, fungicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent, and preferably 0.5–90 percent, by weight of the mixture, whereas carrier composition mixtures suitable for direct application or field application generally contemplate those in which the active compound is present in an amount substantially between about 0.0005–50 percent, preferably 0.001–20 percent, or even 20–50 percent, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.005–95 percent, and preferably 0.001–95 percent, by weight of the mixture.

The active compounds can also be used in accordance with the well-known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound or even the 100 percent active substance alone, e.g., about 20–100 percent by weight of the active compound.

Furthermore, the present invention contemplates methods of selectively killing, combating or controlling correspondingly rodents and leporine animals, which comprise applying to at least one of correspondingly (a) such rodents, (b) such leporine animals and (c) the corresponding habitat thereof, i.e., the locus to be protected, a rodenticidally effective or correspondingly toxic amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, squirting, and the like, for example onto surfaces inhabited by the pests such as an agricultural area, etc.

It will be realized, of course, that the concentration of the particular active compound utilized, alone or in admixture with the carrier vehicle, may vary within a fairly wide range and will depend upon the intended application as the artisan will appreciate. Therefore, in special cases. it is possible to go above or below the aforementioned concentration ranges.

The outstanding selective rodenticidal effectiveness of the particular active compounds usable according to the present invention, as well as their distinct superiority compared with known products of the same type of activity and analogous constitution, is illustrated, without limitation, by the following examples.

EXAMPLE 1

Surface poisoning test

Experiment animal: common vole (*Microtus arvalis*)

Eighty common voles are let loose in an open plot of size 5 × 5 square meters boxed in by asbestos cement sheets, the ground being uniformly and densely overgrown with grass of about 10 cm length. Twenty-four hours later, when the animals have become accustomed to the place and have constructed their burrows, an aqueous preparation of the particular active compound is uniformly applied to the entire surface by means of a spraying device.

In order to produce a suitable preparation, the given active compound is dissolved in a suitable organic solvent (for example xylene), a commercially available non-ionic emulsifier (for example based on a benzylhydroxydiphenylpolyglycol-ether) is added to the mixture, and the resulting emulsion is diluted with water with constant stirring until the desired final concentration is reached.

One hundred ml of the liquor containing the active compound are applied per $m^2$ of grass surface and subsequently the animals which have died are gathered up daily from the surface of the soil. The final assessment is made on the sixth day (after spraying) by digging up the burrows and, where appropriate, carefully sorting through the upper layers of soil.

The success of the experiment is expressed in terms of the number of survivors, given as a percentage of the total number of common voles employed, 0 percent of survivors thus denotes total destruction.

The particular active compounds employed, the liquor concentrations used, the amounts used, the toxic doses applied per unit surface, and the results obtained can be seen from Table 1 below.

Column III shows the unusually high rodenticidal power of the active compounds according to the present invention, and column IV shows that the instant compounds offer distinct advantages compared to active substances already known, even taking their peroral acute toxicities into account.

The figures in column IV indicate how many times the lethal dosage for 1 kg of rat is present in the amount of active compound applied per $m^2$ in each case. The greater is this parameter, the more unfavorable is the particular preparation.

TABLE 1.—SURFACE POISONING TEST/COMMON VOLE

| Active compound | Active compound concentration in the liquor (percent) | Amount of active compound used per hectare (gram) | Amount of active compound used (mg./$m^2$)/$LD_{50}$ of rat (mg./kg.) | Percent survivors after 6 days |
|---|---|---|---|---|
| I | II | III | IV | V |
| (A) 1,2,3,4,10,10-hexachloro-exo-6,7-epoxy-1,4,4a,5,6,7,8,8a-octahydro-1,4,5,8-endo,endo-dimethano naphthalene (known). | 0.01 | 100 | *1.37 | 0 |
| (A') do | 0.005 | 50 | *0.7 | 13.8 |
| (B) Chlorinated camphene (known) | 0.2 | 2,000 | *1.6 | 0 |

Table 1 — Continued

| Active compound | Active compound concentration in the liquor (percent) | Amount of active compound used per hectare (gram) | Amount of active compound used (mg./m.²)/LD$_{50}$ of rat (mg./kg.) | Percent survivors after 6 days |
|---|---|---|---|---|
| I | II | III | IV | V |
| (C) H$_5$C$_2$–N(O)(P)(O–C$_6$H$_4$–Cl)(O–C$_6$H$_4$–Cl) with H$_5$C$_2$ (known from German Pat. 1,076,437) | 0.1 | 1,000 | ** 2.5 | 3.8 |
| (D) HN=C(CH$_3$)–NH–P(S)(O–C$_6$H$_4$–Cl)(O–C$_6$H$_4$–Cl) (known from German Pat. 1,196,897) | 0.1 | 1,000 | ** 10 | 0 |
| (E) O,O-diethyl-O-(4-nitro-phenyl)-thionophosphoric acid ester (known) | 0.02 | 200 | ** 3.1 | 77.5 |
| Untreated control | | | | 100 |
| (1$_1$) H$_3$CS–C$_6$H$_3$(CH$_2$N(C$_2$H$_5$)$_2$)–O–P(S)(O.C$_2$H$_5$)(C$_2$H$_5$) | 0.002 | 20 | ** 0.9 | 0 |
| (2$_1$) H$_3$CSO–C$_6$H$_3$(CH$_2$N(C$_2$H$_5$)$_2$)–O–P(S)(O.C$_2$H$_5$)(O.C$_2$H$_5$) | 0.002 | 20 | ** 0.5 | 0 |

\* LD$_{50}$ value according to German Pat. 1,218,460, column 6.
\*\* LD$_{50}$ values determined at the Institute of Toxicology, Wuppertal, Germany.

EXAMPLE 2

Fish toxicity test

The method described in detail in example 1 is used to produce a suitable active compound preparation. The experiments are carried out in all-glass aquaria holding 15 l, each occupied by 10 goldfish (*Carassius auratus*) of about 5 cm body length. During the time of the experiment the aquaria are aerated in the usual manner. The feeding with commercially available dry food begins 24 hours after starting the experiments. The water temperature is 24°C.

The particular active compounds tested, their concentrations, and the results obtained (LC$_{50}$ = concentration at which 50 percent of the experimental fish used die) appear in the following Table 2.

EXAMPLE 3

Secondary toxicity test/birds of prey

Experiment animals: 2 screech owls (*Strix aluco*), 1 Tengmalm's owl (*Aegolius tengmalmi*)

The owls kept individually in wire cages each received five common voles on each of 10 days, the common voles having been killed under practical conditions (such as described in Example 1) with a deliberately high quantity of 150 grams of active compound (1) or (2), as the case may be, per hectare. The two screech owls in total ate 17 and 25 dead common voles, respectively, and the Tengmalm's owl ate 26 dead common voles. None of the owls showed symptoms of poisoning during the feeding period and a 2-week post-observation period.

TABLE 2.—FISH TOXICITY TEST/GOLDFISH

| Active compound | Active compound concentration (p.p.m.) | Percent mortality after hours | | | LC$_{50}$ for 96 hours (p.p.m.) |
|---|---|---|---|---|---|
| | | 24 | 48 | 96 | |
| (A) 1,2,3,4,10,10-hexachlor-exo-6,7-epoxy-1,4,4a,5,6,7,8,8a-octahydro-1,4,5,8-endo, endodimethane-naphthalene (known). | 0.02 | ª 100 | | | 0.01 |
| | 0.01 | 0 | 0 | 50 | |
| | 0.001 | 0 | 0 | 0 | |
| (2$_2$) H$_3$CSO–C$_6$H$_3$(CH$_2$–N(C$_2$H$_5$)$_2$)–O–P(S)(O·C$_2$H$_5$)(O·C$_2$H$_5$) | 5 | ª 100 | | | Between 1 and 5. |
| | 1 | 0 | 0 | 0 | |

ª After 1 hour.

Compound (2) thus has a toxicity to fish which is at least 100 times less than that of compound (A).

The findings obtained with chlorinated camphene (B) on young trout may be quoted from the literature (Effects of Pesticides on Fish and Wildlife U.S. Fish and Wildlife Service Circular 226, Aug. 1965, page 56) by way of comparison: at 65°F (18°C) the LC$_{50}$ (96 hours) is 0.0018 ppm.

Against this it emerges from an investigation by E. Schmidt and G. Wellenstein (Allg. Forstzeitschr., 13th year, No. 22(1958), pages 301 to 305), that birds of prey die if they eat common voles which have been killed with 1,2,3,4,10,10-hexachloro-exo-6,7-epoxy-1,4,4a, 5,6,7,8,8a-octahydro-1,4,5,8-endo, endo-dimethane-naphthalene (A) or chlorinated camphene (B).

3,679,796

EXAMPLE 4

Secondary toxicity test/carnivores
  Experiment animal: domestic cat (*Felis domesticus*)
  Three domestic tomcats were kept separate and each received four common voles on each of 4 successive days. The common voles had been killed with an overdose of 150 grams of active compound (1) or (2), as the case may be, per hectare, under practical conditions, as described in Example 3. Each tomcat ate all 16 poisoned voles. During the test period and the 2-week post-observation none of the animals showed any impairment of its well-being.

EXAMPLE 5

Determination of residue on green plants and in the soil
  In order to produce a suitable active compound preparation, the procedure described in detail in Example 1 is followed and an aqueous emulsion containing 0.01 percent by weight of active compound is prepared. A 4 × 4 square meter lawn surface (height of grass about 10 cm) is uniformly sprayed with this liquor. The treatment mentioned corresponds to the increased amount of active compound used for combating the water vole. Representative samples of grass and soil are taken immediately after spraying and over the subsequent period and are analyzed for their active compound residues. The results obtained are summarized in the following Table 3. It can be seen clearly that the active compound usable according to the present invention are considerably better as regards toxic residues on grass and soil than the comparison agent representing the prior art.

The figures quoted for 1,2,3,4,10,10-hexachloro-exo-6,7-epoxy-1,4,4a,5,6,7,8,8a-octahydro-1,4,5,8-endo, endo-dimethane-naphthalene (A) are taken from an investigation by J. Hurter, H. Zurrer and E. Reuthinger (Z.f. Lebensmittel-Unters. and -Forschg. 130, 1966, pages 20 to 25) and relate to the use of 400 grams of active compound per hectare which is customary in the case of this active compound for combating the water vole.

TABLE 3.—ACTIVE COMPOUND RESIDUES ON GREEN PLANTS AND IN THE SOIL

| Active compound | Amount of active compound, g./ha. | Residue (p.p.m.) | | | | | | | | | | | | | |
|---|---|---|---|---|---|---|---|---|---|---|---|---|---|---|---|
| | | On grass, after weeks— | | | | | | | In soil (covering layer 15–20 cm.), after weeks— | | | | | | |
| | | 0 | 2 | 4 | 6 | 17 | 24 | 26 | 46 | 48 | 0 | 2 | 4 | 6 | 17 | 26 | 48 |
| (A) 1,2,3,4,10,10 hexachloro-exo-6,7-epoxy-1,4,4a,5,6,7,8,8a-octahydro-1,4,5,8-endo, endodimethane naphthalene (known). | 400 | (x) | (x) | (x) | (x) | 1.9 (a) | 0.163–0.420 (a) | 0.118–0.156 (a) | 0.02–0.1 (a) | Traces to 0.06 (a) | (x) | (x) | (x) | (x) | 2.1 (a) | (x) (b) | 0.16–1.07 (a) (c) |
| (2) H$_3$CSO—[phenyl, CH$_2$—N(C$_2$H$_5$)$_2$]—O—P(=S)(O.C$_2$H$_5$)(O.C$_2$H$_5$) | 100 | 1.6 | 0.3 | (n) | (n) | (n) | (n) | (n) | (n) | (n) | (n) | 0.1 | <0.1 | (n) | (n) | (n) | (x) |
| (1) H$_3$CS—[phenyl, CH$_2$—N(C$_2$H$_5$)$_2$]—O—P(=S)(O.C$_2$H$_5$)(C$_2$H$_5$) | 100 | 1.3 | 0.8 | 0.45 | 0.2 | (n) | (n) | (n) | (n) | (n) | (n) | (n) | (n) | (n) | (n) | (n) | (x) |

[a] Literature data (see above).
[b] Layer thickness 0.5 cm.
[c] Relative variation depending on type of soil.
x No determination.
n Not detectable.

In analogous manner to that described in Example 1 it is also possible to use the active compounds identified in Tables 4 and 5 below as surface poisons, in accordance with the present invention. Such compounds perform in essentially the same way as the noted $LD_{50}$ values show.

TABLE 4.—COMPOUNDS OF GENERAL STRUCTURE

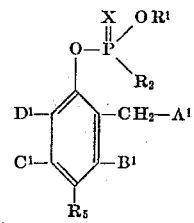

(I₁)

(Unless otherwise stated, B₁, C₁, and D₁ are hydrogen atoms)

| | R¹ | R² | X | A¹ | B¹ | R⁵ | C¹ | D¹ | $LD_{50}$ in mg./kg. of rat, per os |
|---|---|---|---|---|---|---|---|---|---|
| (3₁) | C₂H₅ | C₂H₅ | S | N(C₂H₅)₂ | | CH₃ | | | ~1 |
| (4₁) | C₂H₅ | OC₂H₅ | O | N(C₂H₅)₂ | | Cl | | | 1 to 2.5 |
| (5₁) | C₂H₅ | OC₂H₅ | S | N(C₂H₅)₂ | | Cl | | | ~5 |
| (6₁) | C₂H₅ | C₂H₅ | S | N(C₂H₅)₂ | | Cl | | | 0.2 to 0.5 |
| (7₁) | C₂H₅ | OC₂H₅ | O | N(C₂H₅)₂ | | Cl | | Cl | ~2 |
| (8₁) | C₂H₅ | OC₂H₅ | S | N(C₂H₅)₂ | | Cl | | Cl | 7 to 8 |
| (9₁) | C₂H₅ | C₂H₅ | S | N(C₂H₅)₂ | | Cl | | Cl | ~2 |
| (10₁) | C₂H₅ | OC₂H₅ | O | N(CH₃)₂ | | Cl | | Cl | 12 to 25 |
| (11₁) | C₂H₅ | OC₂H₅ | O | N(C₂H₅)₂ | Cl | Cl | | Cl | 2.5 to 5 |
| (12₁) | C₂H₅ | OC₂H₅ | S | N(C₂H₅)₂ | Cl | Cl | | Cl | 4 to 5 |
| (13₁) | C₂H₅ | C₂H₅ | S | N(C₂H₅)₂ | Cl | Cl | | Cl | 1 to 2 |
| (14₁) | C₂H₅ | C₂H₅ | S | N(CH₃)₂ | Cl | Cl | | Cl | 1 to 2 |
| (15₁) | C₂H₅ | C₂H₅ | S | N(CH₃)₂ | | SCH₃ | | | ~10 |
| (16₁) | C₂H₅ | OC₂H₅ | S | N(C₂H₅)₂ | | SCH₃ | | | ~1 |
| (17₁) | C₂H₅ | OC₂H₅ | O | N(CH₂—CH=CH₂)₂ | | SCH₃ | | | ~10 |
| (18₁) | C₂H₅ | C₂H₅ | S | N(CH₂—CH=CH₂)₂ | | SCH₃ | | | 25 to 50 |
| (19₁) | C₂H₅ | OC₂H₅ | S | N⟨ ⟩H (piperidinyl) | | SCH₃ | | | ~7 |
| (20₁) | C₂H₅ | C₂H₅ | S | Same as above | | SCH₃ | | | ~1 |
| (21₁) | C₂H₅ | OC₂H₅ | S | N⟨ ⟩O (morpholinyl) | | SCH₃ | | | ~15 |
| (22₁) | C₂H₅ | C₂H₅ | S | N(CH₂—CH—C₄H₉)₂ with C₂H₅ | | SCH₃ | | | 10 to 25 |
| (23₁) | C₂H₅ | OC₂H₅ | O | N(C₄H₉-n)₂ | | SOCH₃ | | | 20 to 37 |
| (24₁) | C₂H₅ | OC₂H₅ | S | N(C₄H₉-n)₂ | | SOCH₃ | | | 37 to 75 |
| (25₁) | C₂H₅ | C₂H₅ | S | N(C₄H₉-n)₂ | | SOCH₃ | | | 25 to 50 |
| (26₁) | C₂H₅ | OC₂H₅ | O | N(C₂H₅)₂ | | SO₂CH₃ | | | 2 to 4 |
| (27₁) | C₂H₅ | OC₂H₅ | O | N(C₂H₅)₂ | | SO₂CH₃ | | | 0.5 to 1 |
| (28₁) | C₃H₇-i | OC₃H₇-i | O | N(C₂H₅)₂ | | SO₂CH₃ | | | ~25 |
| (29₁) | C₂H₅ | OC₂H₅ | S | N(C₄H₉-n)₂ | | SO₂CH₃ | | | ~12.5 |
| (30₁) | C₂H₅ | C₂H₅ | S | N(C₄H₉-n)₂ | | SO₂CH₃ | | | 4 to 5 |
| (31₁) | C₂H₅ | OC₂H₅ | O | N(CH₂—CH=CH₂)₂ | | SO₂CH₃ | | | 5 to 10 |
| (32₁) | C₂H₅ | C₂H₅ | S | N(CH₂—CH=CH₂)₂ | | SO₂CH₃ | | | 5 to 10 |
| (33₁) | C₂H₅ | OC₂H₅ | S | N(C₂H₅)₂ | | CN | | | ~2 |
| (34₁) | C₂H₅ | C₂H₅ | S | N(C₂H₅)₂ | | CN | | | ~3 |
| (35₁) | C₂H₅ | OC₂H₅ | S | N(CH₂—CH=CH₂)₂ | | CN | | | ~20 to 50 |
| (36₁) | C₂H₅ | C₂H₅ | S | N(C₂H₅)₂ | | CONH₂ | | | 3 |
| (37₁) | C₂H₅ | C₂H₅ | S | N(C₂H₅)₂ | | NO₂ | | | 5 to 10 |
| (38₁) | C₂H₅ | C₂H₅ | S | N(C₂H₅)₂ | | NO₂ | | | ~0.5 |
| (39₁) | C₂H₅ | OC₂H₅ | S | N(CH₂CH₂—CN)₂ | | NO₂ | | | 10 to 20 |
| (40₁) | C₂H₅ | OC₂H₅ | O | N(C₄H₉-i)₂ | | NO₂ | | | 10 to 20 |
| (41₁) | C₂H₅ | C₂H₅ | S | N(C₄H₉-n)₂ | | NO₂ | | | 5 to 10 |
| (42₁) | C₂H₅ | OC₂H₅ | O | N(CH₂—CH=CH₂)₂ | | NO₂ | | | ~20 |
| (43₁) | C₂H₅ | OC₂H₅ | S | N⟨ ⟩H | | NO₂ | | | 0.5 to 1 |
| (44₁) | C₂H₅ | C₂H₅ | S | N⟨ ⟩H | | NO₂ | | | ~5 |
| (45₁) | C₂H₅ | C₂H₅ | S | N(CH₂—CH—C₄H₉)₂ with C₂H₅ | | NO₂ | | | ~5 |
| (46₁) | C₂H₅ | C₂H₅ | S | N(C₂H₅)₂ | | NO₂ | CH₃ | | ~7 |
| (47₁) | C₂H₅ | OC₂H₅ | S | N(CH₂—CH=CH₂)₂ | | NO₂ | CH₃ | | ~10 |
| (48₁) | C₂H₅ | C₂H₅ | S | N(C₂H₅)₂ | | NO₂ | Cl | | 10 to 20 |
| (49₁) | C₂H₅ | OC₂H₅ | S | N(C₂H₅)₂ | | NO₂ | | Cl | 5 to 10 |
| (50₁) | C₂H₅ | C₂H₅ | S | N(C₂H₅)₂ | | Cl | NO₂ | | ~4 |

TABLE 5.—COMPOUNDS OF GENERAL STRUCTURE

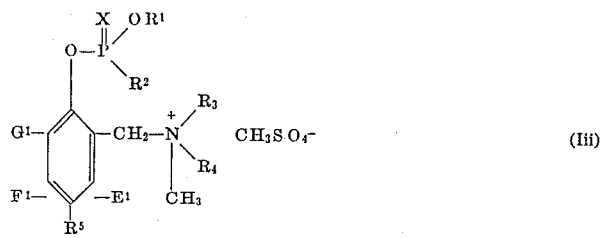

(Unless otherwise stated, $E^1$, $F^1$ and $G^1$ are hydrogen atoms)

| | $R^1$ | $R^2$ | X | $R^3$ | $R^4$ | $E^1$ | $R^5$ | $F^1$ | $G^1$ | $LD_{50}$ in mg./kg. of rat, per os |
|---|---|---|---|---|---|---|---|---|---|---|
| (51₁) | $C_2H_5$ | $C_2H_5$ | S | $C_2H_5$ | $C_2H_5$ | | Cl | | Cl | ~55 |
| (52₁) | $C_2H_5$ | $OC_2H_5$ | S | $R^3+R^4:N\diagdown H$ | | Cl | Cl | | Cl | ~15 |
| (53₁) | $C_2H_5$ | $C_2H_5$ | S | Same as above | | | $SCH_3$ | | | ~10 |
| (54₁) | $C_2H_5$ | $C_2H_5$ | S | do | | | $NO_2$ | | | ~10 |

Typical preferred compounds usable according to the present invention include:

1. ethyl-0-ethyl-0-(2-diethylaminoemethyl-4-methylmercapto-phenyl)-thionophosphonic acid ester
2. 0,0-diethyl-0-(2-diethylaminomethyl-4-methylsulfoxyl-phenyl)-thionophosphoric acid ester It will be realized by the artisan that all of the foregoing compounds (including said salts) contemplated by the present invention possess the desired strong and selective rodenticidal properties, i.e., for controlling and destroying selectively rodents and leporine animals, as well as a comparatively low toxicity toward other warm-blooded creatures, such as useful birds, domestic animals and game, and toward fish, without leaving toxic residues in and on plants and soil, enabling such compounds to be used with correspondingly favorable compatibility with respect to such other warm-blooded creatures, fish, plant life and soil, for more effective control and/or elimination of such rodent and leporine animal pests by application of such compounds to such rodents, leporine animals and/or their habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. A method of combating rodents and leporine animal pests which comprises applying to such pests a correspondingly toxic amount of a compound selected from the group consisting of phosphorus acid ester of the formula

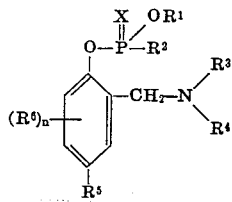

in which $R^1$ is alkyl of one to four carbon atoms, $R^2$ is selected from the group consisting of $OR^1$ and alkyl of one to four carbon atoms, $R^3$ and $R^4$ each individually is selected from the group consisting of alkyl of one to four carbon atoms, alkenyl to three to four carbon atoms, and cyanoalkyl having one to four carbon atoms in the alkyl moiety, with the proviso that $R^3$ and $R^4$ when taken together with the adjacent N atom form a member selected from the group consisting of pyrrolidino, piperidino, and morpholino, $R^5$ is selected from the group consisting of alkyl of one to four carbon atoms, alkylmercapto of one to four carbon atoms, alkylsulfoxyl of one to four carbon atoms, alkylsulfonyl of one to four carbon atoms, nitro, cyano, aminocarbonyl, and chloro, $R^6$ is selected from the group consisting of chloro, nitro, and alkyl of one to four carbon atoms, X is selected from the group consisting of oxygen and sulfur, and $n$ is a whole number from 0 to 2; and corresponding dimethyl sulfate quaternary ammonium salt thereof.

2. The method of claim 1 wherein such compound is selected from the group consisting of said ester in which $R^1$ is $C_{1-3}$ alkyl, $R^2$ is selected from the group consisting of $OR^1$ and $C_{1-3}$ alkyl, $R^3$ and $R^4$ each individually is selected from the group consisting of $C_{1-8}$ alkyl, $C_{3-4}$ alkenyl, and $\omega$-cyano-$C_{1-3}$ alkyl, with the proviso that $R_3$ and $R^4$ when taken together with the adjacent N atom form a member selected from the group consisting of pyrrolidino, piperidino, and morpholino, $R^5$ is selected from the group consisting of $C_{1-3}$ alkyl, $C_{1-3}$ alkylmercapto, $C_{1-3}$ alkylsulfoxyl, $C_{1-3}$ alkylsulfonyl, nitro, cyano, aminocarbonyl, and chloro, $(R^6)_n$ is selected from the group consisting of 5- and 6-chloro, 3,6-dichloro, 5-($C_{1-3}$ alkyl), and 5-nitro, X is selected from the group consisting of oxygen and sulfur, and $n$ is 0–2; and the corresponding dimethyl sulfate quaternary ammonium salt thereof.

3. The method of claim 1 wherein $R^1$ is $C_{1-2}$ alkyl, $R^2$ is selected from the group consisting of $OR^1$ and $C_{1-2}$ alkyl, $R^3$ and $R^4$ each individually is $C_{1-2}$ alkyl, $R^5$ is selected from the group consisting of $C_{1-2}$ alkylmercapto and $C_{1-2}$ alkyl-sulfoxyl, X is sulfur, and $n$ is 0.

4. The method of claim 1 wherein such compound is said phosphorus acid ester.

5. The method of claim 1 wherein such compound is said corresponding dimethyl sulfate quaternary ammonium salt.

6. The method of claim 1 wherein X is sulfur.

7. The method of claim 1 wherein such compound is ethyl-0-ethyl0-(2-diethylaminomethyl-4-methylmercapto-phenyl)-thionophosphonic acid ester.

8. The method of claim 1 wherein such compound is 0,0-diethyl-0-(2-diethylaminomethyl-4methylsulfoxyl-phenyl)-thionophosphoric acid ester.

9. The method of claim 1 wherein such compound is used in the form of a mixture with a carrier vehicle, said compound being present in a rodenticidally effective amount and constituting substantially between about 0.00 05–95 percent by weight of the mixture.

10. The method of claim 9 wherein said amount is substantially between about 0.00 05–50 percent by weight of the mixture.

\* \* \* \* \*

UNITED STATES PATENT OFFICE
CERTIFICATE OF CORRECTION

Patent No. 3,679,796  Dated July 25, 1972

Inventor(s) Gunter Hermann et al

It is certified that error appears in the above-identified patent and that said Letters Patent are hereby corrected as shown below:

Col. 3, line 17 after "eight" insert -- carbon --.

Col. 3, line 31

"107" should be -- ω --

Col. 4, line 43

"inert," should be -- inert, ( --

Col. 5, line 36

"0.005" should be -- 0.0005 --

Col. 7, line 75

"18°C" should be -- 18.3°C --

Col. 11, Table 4, No. 21

"  " should be -- 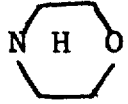 --

UNITED STATES PATENT OFFICE
CERTIFICATE OF CORRECTION

Patent No. 3,679,796  Dated July 25, 1972

Inventor(s) Gunter Hermann et al

It is certified that error appears in the above-identified patent and that said Letters Patent are hereby corrected as shown below:

Col. 13, line 27

"diethylaminoemethyl" should be -- diethylaminomethyl --

Col. 13, line 69

"four" should be -- eight --

Col. 14, line 35

"cOnsisting" should be -- consisting --

Col. 14, line 31 insert "the" before "corresponding"

Col. 14, line 63

"O-ethyl-1O-" should be -- O-ethyl-O- --

Signed and sealed this 9th day of January 1973.

(SEAL)
Attest:

EDWARD M. FLETCHER, JR.
Attesting Officer

ROBERT GOTTSCHALK
Commissioner of Patents